US005170271A

United States Patent [19]
Lackner et al.

[11] Patent Number: 5,170,271
[45] Date of Patent: Dec. 8, 1992

[54] SHAPED VOLTAGE PULSE METHOD FOR OPERATING A POLYMER DISPERSED LIQUID CRYSTAL CELL, AND LIGHT VALVE EMPLOYING THE SAME

[75] Inventors: Anna M. Lackner, Los Angeles; J. David Margerum, Woodland Hills; Elena Sherman, Santa Monica, all of Calif.

[73] Assignee: Hughes Aircraft Company, Los Angeles, Calif.

[21] Appl. No.: 648,479

[22] Filed: Jan. 31, 1991

[51] Int. Cl.$^5$ ...................... G02F 1/133; G02F 1/135
[52] U.S. Cl. ........................................ 359/51; 359/55; 359/72; 359/84; 340/784
[58] Field of Search ................... 359/51, 245, 52, 55, 359/72, 84, 85, 99, 102; 340/765, 784, 805; 358/236

[56] References Cited

U.S. PATENT DOCUMENTS

| | | | |
|---|---|---|---|
| 3,957,349 | 5/1976 | Nelson | 359/92 |
| 4,126,382 | 11/1978 | Barzilai et al. | 359/65 |
| 4,317,115 | 2/1982 | Kawakami et al. | 340/784 |
| 4,378,955 | 4/1983 | Bleha, Jr. et al. | 359/93 |
| 4,411,496 | 10/1983 | Nonomura et al. | 359/93 |
| 4,591,849 | 5/1986 | Hughes et al. | 340/805 |
| 4,608,558 | 8/1986 | Amstutz et al. | 340/784 |
| 4,664,483 | 5/1987 | Van Sprang et al. | 359/75 |
| 4,779,959 | 10/1988 | Saunders | 359/77 |
| 4,917,470 | 4/1990 | Okada et al. | 359/56 |
| 5,004,323 | 4/1991 | West | 359/51 |
| 5,056,898 | 10/1991 | Ma et al. | 359/94 |

FOREIGN PATENT DOCUMENTS 0313053 4/1989 European Pat. Off. .

OTHER PUBLICATIONS

Kunigita et al., "A Full-Color Projection TV Using LC/Polymer Composite Light Valves", *SID International Symposium Digest*, May 1990, pp. 227–230.

Lauer et al., "A Frame-Sequential Color-TV Projection Display", *SID International Symposium Digest*, May 1990, pp. 534–537.

Efron et al., "A Submicron Metal Grid Mirror Liquid Crystal Light Valve for Optical Processing Applications", *SPIE*, vol. 1151, Optical Information Processing Systems and Architectures (1989), pp. 591–606.

Efron, "The Silicon Liquid-Crystal Light Valve", *Journal of Applied Physics*, vol. 57, No. 4, 15 Feb. 1985, pp. 1356–1368.

Margerum et al., "Reversible Ultlraviolet Imaging with Liquid Crystals", *Appl. Phys. Lett.*, vol. 17, No. 2, 15 Jul. 1970, pp. 51–53.

Sterling et al., "Video-Rate Liquid-Crystal Light-Valve Using an Amorphous Silicon Photoconductor", *SID 90 Digest*, 17A.2, 1990, pp. 327–329.

Ashley et al., "Amorphous Silicon Photoconductor in a Liquid Crystal Spatial Light Modulator", *Applied Optics*, vol. 26, No. 2, 15 Jan. 1987, pp. 240–246.

(List continued on next page.)

Primary Examiner—Janice A. Howell
Assistant Examiner—Tai V. Duong
Attorney, Agent, or Firm—E. E. Leitereg; W. K. Denson-Low

[57] ABSTRACT

A shaped voltage pulse is applied to a polymer dispersed liquid crystal (PDLC) cell to control its transmission characteristics. The voltage has an initially high level that substantially exceeds the PDLC's threshold voltage. The initial voltage duration is relatively short, and is followed by a gradual reduction of the voltage to a level less than the threshold voltage within a given time frame; the voltage is preferably reduced at a generally exponential rate. Fast response is obtained by setting the initial voltage substantially above the voltage level that corresponds to the desired transmission level in the steady state; the voltage decays from its initial level so that the PDLC transmission actually peaks at the desired range. The shaped waveform forces the PDLC to operate on a hysteresis curve along which the reduction in transmission is delayed as the voltage decays, thereby increasing the cell's optical throughput. The invention is particularly applicable to liquid crystal light valves.

20 Claims, 5 Drawing Sheets

OTHER PUBLICATIONS

G. P. Montgomery: "Polymer-dispersed liquid crystal films for light control applications", SPIE, vol. 1080, 1989, pp. 242-249.

Afonin et al., "Optionally Controllable Transparencies Based on Structures Consisting of a Photoconductor and a Polymer-Encapsulated Nematic Liquid Crystal", Sov. Tech. Lett. 14(1), Jan. 1988, pp. 56, 58.

Macknick et al., "High Resolution Displays Using NCAP Liquid Crystals", SPIE, vol. 1080, Liquid Crystal Chemistry, Physics and Applications (1989), pp. 169-173.

Takizawa et al., "Transmission Mode Spatial Light Modulator Using a $B_{12}SiO_{20}$ Crystal and Polymer-Dispersed Liquid-Crystal Layers", Appl. Phys. Lett. 56(11), 12 Mar. 1990, pp. 999-1001.

SHAPED VOLTAGE PULSE METHOD FOR OPERATING A POLYMER DISPERSED LIQUID CRYSTAL CELL, AND LIGHT VALVE EMPLOYING THE SAME

BACKGROUND OF THE INVENTION

1. Field of the Invention

This invention relates to methods for operating a dynamic response polymer dispersed liquid crystal (PDLC) cell to increase its transmissivity and responsivity, and to PDLC light valve systems employing such methods.

2. Description of the Related Art

Photoactivated and charge-coupled device (CCD) addressed liquid crystal light valves (LCLVs) are well known, and are described for example in Margerum et al., "Reversible Ultraviolet Imaging With Liquid Crystals", *Appl. Phys. Letters*, Vol. 17, No. 2, 15 July 1970, pages 51–53, Efron et al., "The Silicon Liquid-Crystal Light Valve", *Journal of Applied Physics*, Vol. 57, No. 4, 15 February 1985, pages 1356–68, Efron et al., "A Submicron Metal Grid Mirror Liquid Crystal Light Valve for Optical Processing Applications", *SPIE*, Vol. 1151, 1989, pages 591–606, and Sterling et al., "Video-Rate LCLV Using an Amorphous Silicon Photoconductor", *SID 90 Digest*, Vol. 21, paper 17A.2, 16 May 1990. They use various types of nematic liquid crystal layers to modulate a readout light beam, which may be used in a transmissive or reflective mode of operation, depending upon the design of the LCLV and the input signal. Photoactivated LCLVs are often addressed with an input image to be amplified, such as that presented by the phosphor screen of a cathode ray tube or a scanning laser beam, particularly for dynamic modulation of a readout beam.

Nematic LCLVs operate by modulating the spatial orientation of the liquid crystals in a cell, in accordance with the input signal pattern. This often requires the use of polarizers to obtain a corresponding modulation of the readout beam. The polarizers, however, reduce the total light throughput. Also, alignment layers are needed on each side of the cell for surface alignment of the liquid crystals, thus adding to the expense of the device. The response time of the nematic liquid crystal to changes in the voltage across the cell may also be somewhat limited.

More recently, polymer dispersed liquid crystal (PDLC) films have been reported, including the use of such films in photoactive LCLVs and in active matrix LCLV projection displays. Unlike most nematic liquid crystal cells which modulate the optical polarization in response to an applied voltage, PDLCs scatter light and become transparent with an applied voltage. They have several advantages over nematic liquid crystal devices, including the elimination of surface alignment layers and polarizers, and a faster response time. However, while PDLCs exhibit a rapid response to a shift in applied voltage between fully OFF and fully ON voltage levels, their response to gray scale levels (levels not fully on or fully off) is quite slow.

LCLVs are generally operated with an alternating current applied voltage, since the liquid crystals tend to deteriorate under a DC voltage. There have been several reports of the response of PDLC-type films to square wave type voltage pulses, including the use of such films in photoactivated LCLVs and in active matrix LCLV projection displays. In Afonin et al., "Optically Controllable Transparencies Based on Structures Consisting of a Photoconductor and a Polymer-Encapsulated Nematic Liquid Crystal", *Sov. Tech. Phys. Lett.*, Vol. 14, No. 56, January 1988, pages 56–58, a PDLC-type film was photoactivated with a ZnSe photoconductor. The photoactivated rise and decay times (with a constant bias voltage in typical LCLV operation) were 5–10 ms on-time and 1.5–3 seconds off-time; thus, the frame time (on-time plus off-time) is very slow compared to a dynamic television image frame time of less than 33 ms. The response of the PDLC-type film layer to a square voltage pulse was much faster, with rise and decay times of less than 1 ms and 15 ms, respectively, but such a pulse shape and response time is not attainable with this photoconductor.

In Macknick et al., "High Resolution Displays Using NCAP Liquid Crystals", Liquid Crystal Chemistry, Physics, and Applications, *SPIE*, Vol. 1080, January 1989, pages 169–173, fast response PDLC-type films were reported with a square pulse input signal of 5.3 ms. About 50% transmission was reached during the 5.3 ms pulse, and the decay time at the end of the pulse was about 2 ms; full voltage activation of the film was not shown.

In Takizawa et al., "Transmission Mode Spatial Light Modulator Using a $B_{12}SiO_{20}$ Crystal and Polymer-Dispersed Liquid Crystal Layers", *Appl. Phys. Lett.*, Vol. 56, No. 11, March 1990, pages 999–1001, fast photoactivated PDLC film response of 10 ms ON and 36 ms OFF was reported for a 60 ms square pulse of bright white activating light with a 30 volt bias across a photoconductor/PDLC cell. A hysteresis loop was reported when the cell was scanned with increasing and decreasing writing light intensities, but the loops were said to disappear when pulsed write light was incident on the device. Response times were reported and discussed only for square wave intensity writing light pulses.

In Kunigita et al., "A Full-Color Projection TV Using LC/Polymer Composite Light Valves", *SID International Symposium Digest*, May 1990, pages 227–230, a low voltage PDLC-type film was used in an active matrix display with a poly-Si thin film transistor and a storage capacitor for each pixel. Three active matrix cells were used for red, blue and green channels of full color projection TV. The response time of the PDLC-type film to a square wave voltage pulse was given for a full on-time of 35 ms and a decay) time of 25 ms. The use of a storage capacitor at each pixel was necessary to obtain square wave voltage pulses used in this display.

In Lauer et al., "A Frame-Sequential Color-TV Projection Display", *SID International Symposium Digest*, May 1990, pages 534–537, a PDLC active matrix display was made with CdSe thin film transistors. The time response characteristics were fast enough for sequential three-color filtering effects at 50 Hz (6.67 ms for each color). PDLC response times were reported only for 50 volt square wave pulses of 5 ms, with the PDLC reaching a transient 60% transmission level in 5 ms of on-time, and decaying in about 2 ms, giving a relatively low light throughput in the frame time. Full projection light illumination was reported as having a large effect on the thin film transistor off-state current.

In each of the above papers, the PDLC response is described with respect to an idealized step-voltage change, or to a square wave pulse.

SUMMARY OF THE INVENTION

In view of the limitations of the approaches described above, the present invention seeks to provide a method of operating a PDLC cell to provide a higher optical throughput and better gray scale response than has previously been obtained at comparable current levels, while retaining or even improving upon the fast response of PDLC to a voltage change. The invention also describes a photoactivated LCLV system that utilizes this method.

In accordance with the invention, shaped voltage pulses are applied to a PDLC cell such that the cell achieves a higher optical throughput, good gray scale operation, and a rapid response time. The shape refers to the instantaneous rms (rms per cycle) envelope of the applied AC voltage pulse or the instantaneous DC voltage of the applied DC pulse. The applied voltage is referenced to a time frame during which a readout from the PDLC is desired. The voltage level is initially raised to a level substantially in excess of the PDLC's threshold voltage; this initial voltage level is applied for a substantially shorter period than the duration of the time frame. It is then gradually reduced within the time frame to a level less than the threshold voltage. The initial voltage is applied for a substantially shorter period of time than the time over which the voltage is being reduced; the applied voltage waveform is preferably shaped so that this reduction occurs exponentially. Shaped pulse signals of this type can be obtained, for example, from raster scan inputs from a CRT activating a photosubstrate in which the photoactivation of each spot decays fully within the frame time of the full raster scan, or from an active matrix in which the charge on each PDLC picture element (pixel) decays below the threshold voltage within the frame time, in about 3 to 5 RC time constants of the PDLC film.

The voltage waveform takes advantage of a hysteresis effect in the PDLC transmission versus voltage curves that has previously been considered a nuisance because of the difference in transmission values on voltage rise and fall curves, and because of the long times taken to reach steady state transmission levels at intermediate voltages from either the voltage rise or fall curves. The voltage waveform of this invention always starts below the threshold voltage necessary to change the transmission of the PDLC. This shaped waveform begins with a steep initial increase to a voltage that is substantially higher than the minimum steady state voltage needed to obtain the desired PDLC transmission level, maintains this initial voltage for only a short period that is less than the time required for the PDLC to reach a steady state transmission, and then decreases more gradually back down to below the threshold voltage before the end of the frame time. The PDLC responds quickly to the large initial voltage increase which drives it toward a higher transmission hysteresis state. The transmission changes slowly during the gradual decrease of the voltage waveform, permitting a relatively high integrated transmission. The PDLC transmission drops quickly as the voltage decreases to below the threshold level so that by the end of the frame time the PDLC returns to its initial state and is ready to respond to a new pulse (of the same or different voltage level) without any memory effect from the prior pulse. This provides a rapid response to both gray scale and fully ON levels, with a time-integrated voltage that need be no greater than a square wave that produces a lower throughput and a much slower gray scale response.

To minimize electrochemical deterioration of the PDLC, the voltage is preferably applied so that there is no overall net DC current through the PDLC film. For example, in a photoactivated amorphous silicon (a-Si:H) LCLV the applied voltage can be an AC signal, with a periodicity much shorter than that of the frame time, whose pulse envelope establishes the voltage waveform. In an active matrix display the applied voltage can be a series of shaped DC pulses of alternating polarity, each of which establishes the voltage waveform. More complex, unsymmetrical, voltage formats can also be applied, such as are used in MOS-silicon LCLVs, CCD-LCLVs, Schottky-LCLVs, p-i-n photodiode-LCLVs, etc., as long as the desired shaped pulse voltage waveform envelope is obtained. The invention also encompasses an LCLV system which includes an optical input means that, together with the photoconductor, is selected to collectively produce the desired voltage waveform across the PDLC within the light valve.

These and other features and advantages of the invention will be apparent to those skilled in the art from the following detailed description, taken together with the accompanying drawings, in which:

DETAILED DESCRIPTION OF THE INVENTION

Figure 1:
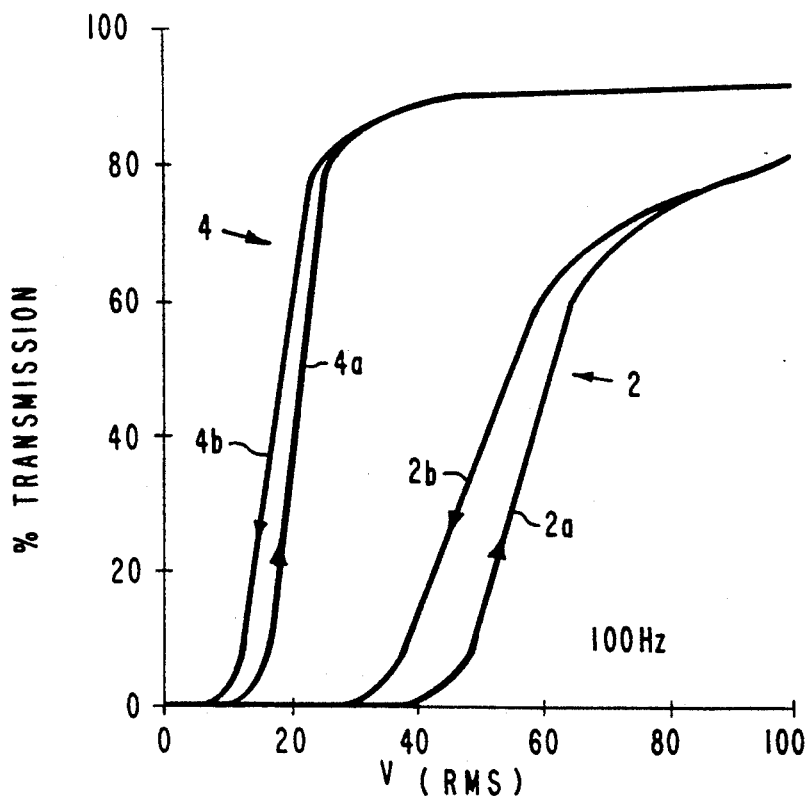
FIG. 1 is a graph of hysteresis curves for two PDLC films.

The present invention takes advantage of a hysteresis effect in PDLC films that previously was considered to be a disadvantage in obtaining gray scale and fast response for displays. Two sets of hysteresis curves showing percent transmission through the PDLC, plotted as a function of RMS voltage across the PDLC, are given in FIG. 1. The right hand set of curves 2 were obtained with BDH-E9/NOA65 PDLC, while the left hand set 4 were obtained with HRL-PD50/NOA65. The rise curves 2a and 4a were obtained by ramping a 100 Hz voltage signal up from zero to a fully ON level of 100 volts over a period of 75 seconds, while the fall curves 2b and 4b were obtained by ramping the voltage back down to zero over another 75 second interval.

As shown in FIG. 1 each type of PDLC exhibits a threshold voltage below which it is non-transmissive. This threshold voltage is about 25 volts for curves 2, and about 6 volts for curves 4. Above these thresholds levels, the hysteresis fall curves 2b,4b are shifted to the left from the rise curves 2a,4a. Thus, for any particular voltage above the threshold level and below the fully ON level, there is a higher degree of transmission through the PDLC on the fall curve than on the rise curve. The invention makes beneficial use of this phenomenon by driving the PDLC cell with a shaped voltage waveform that forces the majority of the transmission period toward the fall curve, and thus produces a substantial increase in the total optical transmission through the PDLC.

Figure 2A:
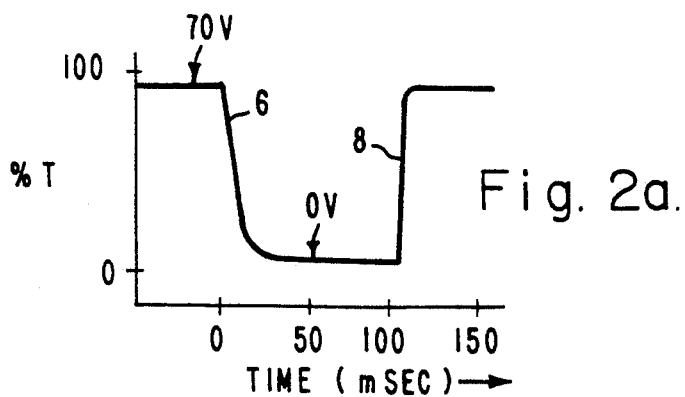
FIGS. 2a, 2b and 2c are graphs showing the response of a PDLC film to step voltage shifts between fully ON and fully OFF levels, fully OFF and nominal half-on levels, and fully ON and nominal half-off levels, respectively.
Figure 2B:
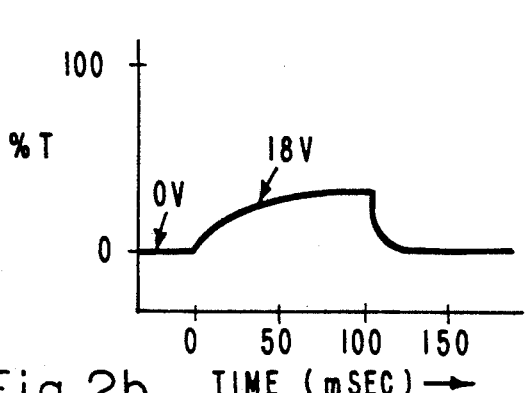
Figure 2C:
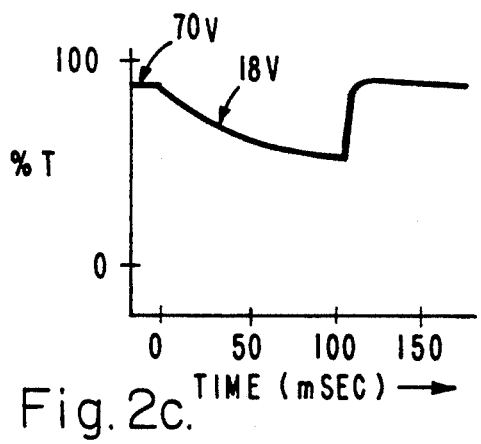

FIGS. 2a-2c illustrate the problem of achieving good gray scale response with PDLC films, using square wave pulse envelopes of 100 Hz AC signals for 100 ms. The fully ON and fully OFF PDLC response times can be quite fast, as shown in FIG. 2a. The PDLC in this case was switched between zero volts and a fully ON level of 70 volts (rms) with a 100 msec square wave pulse. The turn-off time along curve segment 6 was about 7 msec, while the turn-on time along curve 8 was about 1 msec.

However, the dynamic response of the PDLC film was found to be strongly influenced by the hysteresis effect when voltages were switched to intermediate gray scale levels, below the fully ON voltage. FIG. 2b shows the results of switching the voltage from zero volts to a gray scale 18 volt level, while FIG. 2c shows switching from a fully ON 70 volt level to a gray scale 18 volt level. As a reference (not shown), a long-term activation of several minutes at 18 volts resulted in 50% transmission. However, as illustrated in FIG. 2b, the transmission level increased to only about 30% with an 18 volt square wave pulse that commenced at time zero and lasted for 100 msec. The result when the voltage was reduced from 70 volts to 18 volts with a 100 msec square pulse is shown in FIG. 2c—the final transmission level was about 60%. All PDLC-type films that were tested showed this type of hysteresis effect, which on the surface would appear to be a serious deterrent to obtaining rapid response displays with reproducible gray scale.

The invention overcomes this problem in a manner that not only achieves good gray scale operation, but also substantially increases the optical throughput. As mentioned above, a shaped waveform that causes an appreciable part of the PDLC transmission to take place along a hysteresis fall curve at a higher transmission level is used, rather than a square wave. In addition, during the initial portion of the applied waveform the PDLC is overdriven by using an initial voltage level that is substantially higher than the voltage level that would produce the desired transmission level in steady-state operation. However, this initial voltage level is rapidly reduced from its initial high level so that the PDLC peaks at about the desired level of transmission. The voltage is reduced, preferably at an exponential decay rate, causing the PDLC to exhibit a relatively high level of optical transmission along a hysteresis fall curve for as long as the applied voltage is above the PDLC's transmission threshold.

It is important that the applied voltage be brought down to a level below the PDLC's transmission threshold voltage before the end of each time frame so that the PDLC transmission returns to the initial bias level during the frame time. In an LCLV, the time frame is established by the scanning periodicity of the input signal on each pixel, such as from a CRT scan of a photoactivated LCLV or an activating voltage in an active matrix LCLV. Starting each time frame from a voltage level below the threshold ensures that the liquid crystal operates reproducibly for a given signal during each frame.

Several experiments have demonstrated the advantages realized with the specially shaped waveform. In these demonstrations a PDLC sample was prepared by photopolymerization of a 1:1 mixture of Norland NAO65 monomer/initiator and BDH-E7 liquid crystal in a transmission mode test cell formed with indium tin oxide (ITO) coated glass separated by a 0.5 mil spacing. An ultraviolet cure was performed with a 300 Watt mercury lamp (8 mW/cm$^2$ at 365 nm) for three minutes, resulting in liquid crystal droplet sizes estimated at between 1 and 2 microns. The cells were read out with a green HeNe laser beam in examples 1-4 and 6, and a red HeNe laser beam in examples 5 and 7.

EXAMPLE 1

A voltage waveform representing the product of a shaped pulse signal and a bias sine wave signal was applied to the PDLC cell, and repeated every 25 msec. The bias voltage level was established slightly below the PDLC's transmission threshold. The peak voltage level of the shaped pulse was 25 volts while the bias level was 1.5 volts, representing a 16:1 amplitude ratio that was higher than presently available LCLV switching ratios. Bias voltage frequencies of 1, 3 and 5 KHz were tested, and showed no significant change in light throughput or response times.

Figure 3:
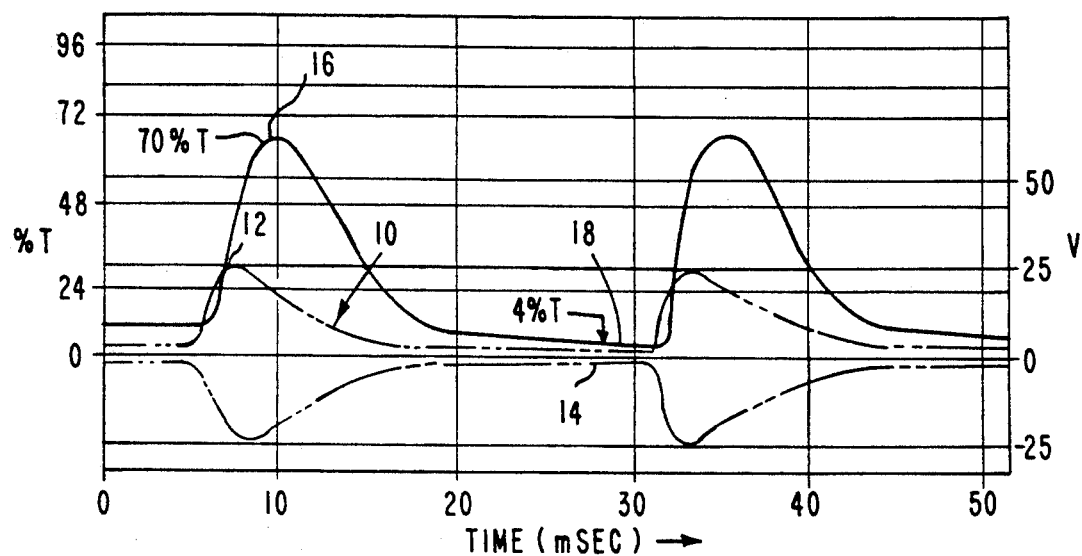
FIGS. 3-6 are graphs of applied AC voltage waveforms and PDLC responses in accordance with the invention.

The PDLC optical response with a 5 KHz bias signal is shown in FIG. 3. The shaped voltage waveform can be considered as the instantaneous rms values from the envelope 10 of the alternating polarity 5 KHz cycles. The applied voltage rose rapidly to its peak level 12, and then decayed approximately exponentially to the bias level 14. A maximum transmission level 16 of about 70% was achieved for about 1 msec, and slowly decreased along a generally exponential curve until the voltage neared the bias level, at which point the transmissivity leveled off in region 18 at about a 4% level; this was retained until the end of the frame.

EXAMPLE 2

Figure 4:
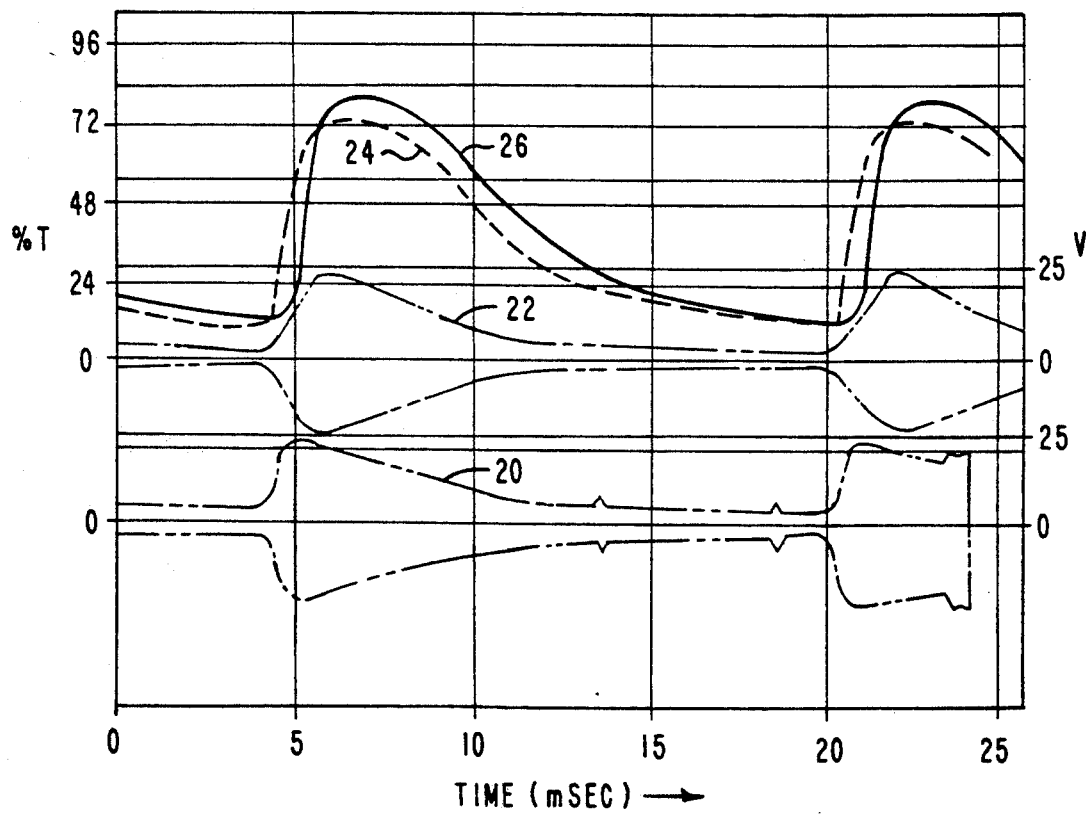

The PDLC sample was tested with a shaped pulse and a 5 KHz bias signal combination, refreshed at a 60 Hz frame rate. The results are shown in FIG. 4. In one case a very fast-rising 0.1 msec pulse signal 20 with a peak level of 25 volts and a bias level of 4.3 volts was used, while in a second case the pulsed signal 22 had the same 25 volt peak voltage, a bias voltage of 2.6 volts, and a slower 1.5 msec rise time. The PDLC optical response to the voltage waveforms within envelopes 20 and 22 is indicated by curves 24 and 26, respectively. The higher bias voltage of signal 20 did not appear to effect the PDLC's off-state transmission or the resulting contrast.

Transmission curve 24 had a faster rise time than curve 26, corresponding to the faster rise time of its voltage signal 20, but a lower peak transmission level corresponding to the more rapid termination of its peak voltage. Both transmission curves 24 and 26 exhibited a fairly high PDLC transmission level until the voltage dropped to the bias value, resulting in a higher optical throughput than a fast response twisted nematic cell.

EXAMPLE 3

Figure 5:
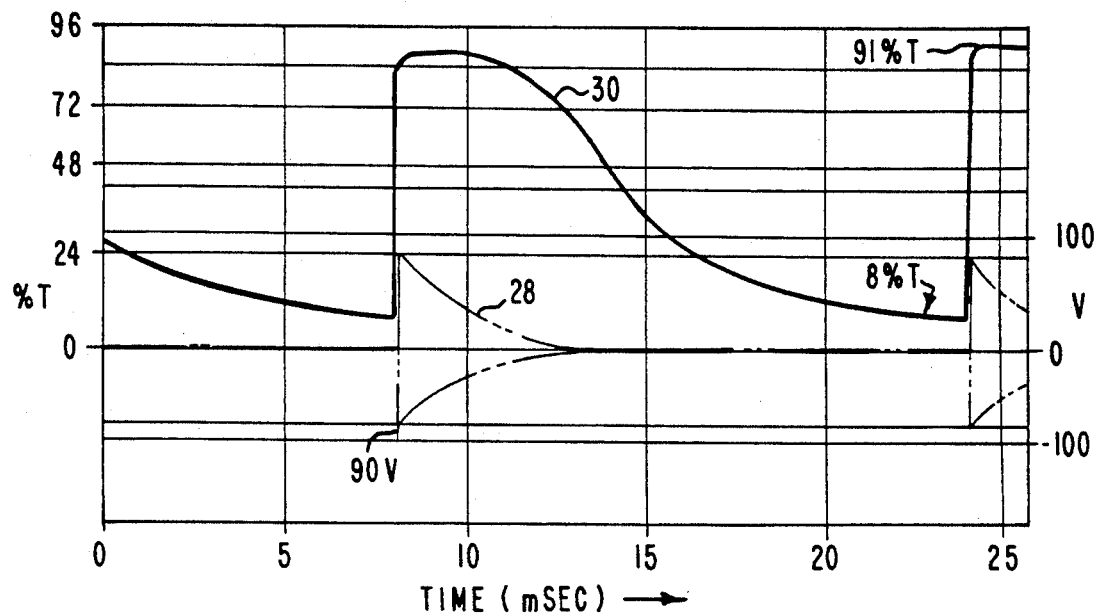

The same PDLC cell was tested with a shaped pulse and a 5 KHz bias signal combination, refreshed at a 60 Hz frame rate. An initial 90 volt peak signal was exponentially decayed down to zero over about half the frame period. This resulted in an initial peak transmission of 91%, which gradually fell to a minimum transmission of 8% by the end of the frame. The voltage envelope 28 and transmission curve 30 are shown in FIG. 5.

EXAMPLE 4

Figure 6:
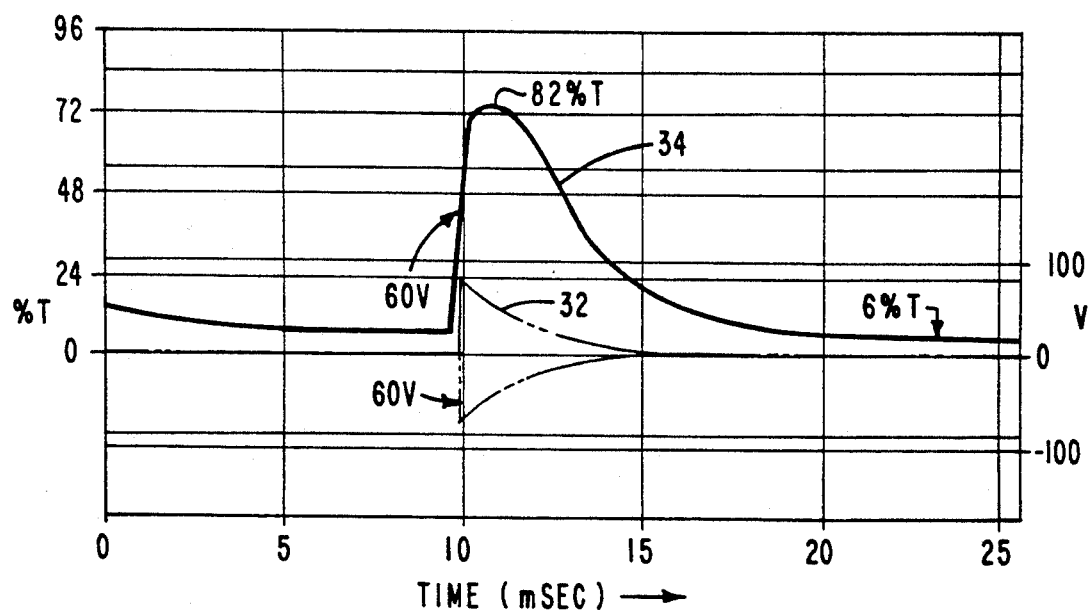

The same conditions were employed as in Example 3, but the initial peak voltage was lowered from 90 volts to 60 volts, as indicated by voltage envelope 32 in FIG. 6. The resulting optical transmission curve 34 exhibited a maximum transmission of 82% and a minimum of 6%. In addition to the change in the maximum and minimum transmission levels, the shape of the transmission decay curve was also changed, with the transmission decaying more rapidly for the lower initial voltage of Example 4. This demonstrated that higher initial voltages (corresponding for example to higher input light levels in a photoconductive LCLV) would result in higher brightness from the PDLC cell, making it possible to achieve quality gray scale operation.

EXAMPLE 5

A similar PDLC cell made with 0.14 mil spacing was subjected to one square voltage pulse and one shaped voltage pulse for comparison, using 10 KHz AC. Both rms signals had the same integrated area (amplitude x pulse width) switching ratio of 1.5, and bias voltage level of 12.7 volts.

Figure 7:
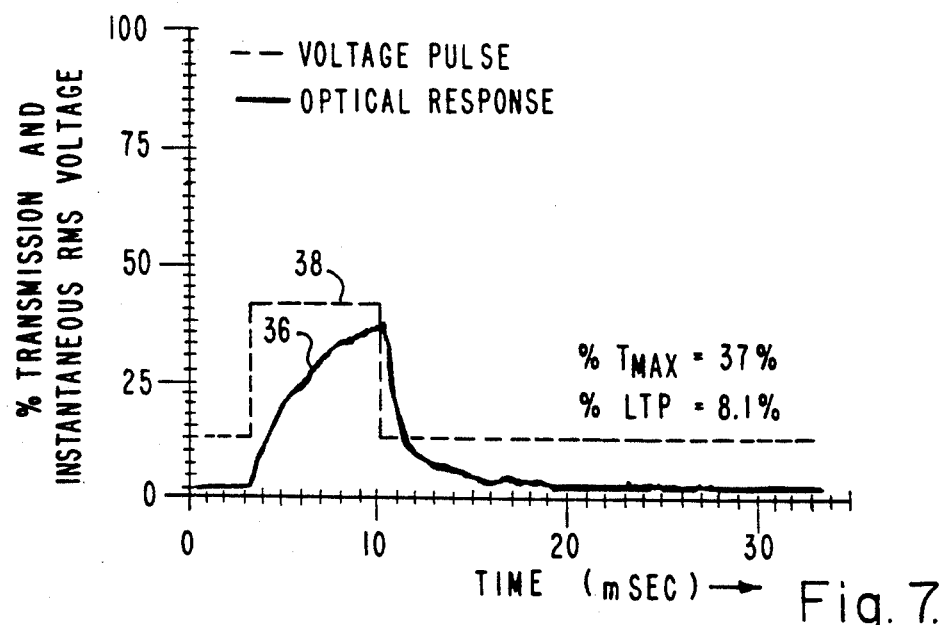
FIGS. 7 and 8 are graphs of a PDLC response respectively to an AC square wave and to an AC voltage waveform that is shaped in accordance with the invention, both voltage signals having approximately the same integrated area.

The optical response 36 to a 7 msec long, 41.1 volt amplitude square wave pulse 38 is shown in FIG. 7. This signal partially activated the PDLC film, reaching a 37% maximum transmission level at the end of the 7 msec pulse, and rapidly decayed to a transmission level of less than 5%. The resulting total light throughput (LTP) was 8.1% for the 30 Hz frame time.

Figure 8:
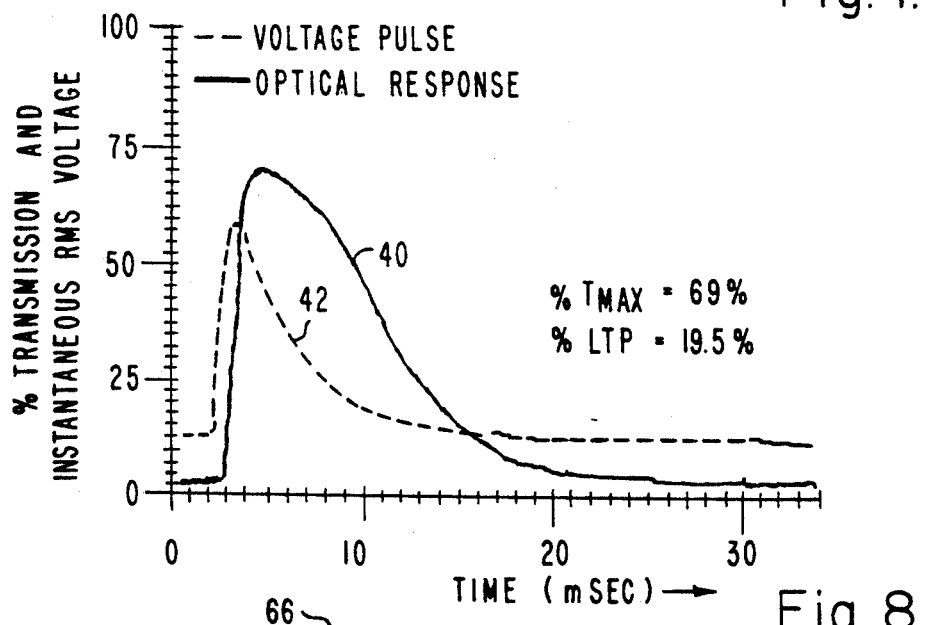

The optical response 40 of the same PDLC film to a shaped pulse 42 with a 60.0 volt peak and a 7 msec decay is shown in FIG. 8. The voltage area of shaped pulse 42 was equal to that of square wave pulse 38. A much faster rise time of 0.83 msec was experienced with the shaped pulse, in contrast to the square wave pulse whose rise time occupied the entire 7 msec. The maximum light transmission for the shaped pulse was 69%, and its total light throughput for the 30 Hz frame time was 19.5%. This example demonstrated the improvements in rise time and light throughput from a shaped pulse signal with a rapid rise and a gradual decay.

EXAMPLE 6

To compare the shaped pulse mode operation of the PDLC film with twisted nematic liquid crystals, the same liquid crystal as in Examples 1-5 was tested in a 90° twisted nematic cell of 4.8 micron thickness. This liquid crystal thickness corresponded to the 10 micron thick PDLC film of Examples 1-5, which contained about 50% liquid crystal by volume. The cell was fabricated with 90° twisted surface parallel alignment between medium angle deposition/shallow angle deposition $SiO_2$ coated conductive electrodes. Transmission measurements were performed with the same optical setup used for the PDLC samples, a green HeNe laser, and two parallel polarizers inserted into the system. Shaped pulses of 5 KHz AC voltages with 25 msec repetition rates, as in Example 1, were used. The maximum rms pulse amplitudes were considerably less than in Example 1, since a substantial portion of the applied voltage in a PDLC cell is dropped across the polymer, rather than the liquid crystals themselves. Steady-state levels of only about 2 volts are usually required to turn this type of liquid crystal cell fully on.

The results of this test are summarized in the table below. The PDLC test cells in FIG. 3 exhibited higher contrast ratios and optical efficiency as compared to the twisted nematic cell, which can be attributed to the PDLC film's fast rise time and the effect of hysteresis in slowing down the optical decay. The test results indicated that the twisted nematic mode response time was too slow for a 25 Hz frame rate with an exponential decay pulse mode operation, and that the transmission decay within each time frame was too slow to obtain contrasts above 5:1 even with a signal ratio of 400:1. The high residual transmission at the end of each frame would also interfere with gray scale changes in a dynamic display. With the same shaped driving pulse, the PDLC film of Example 1 was operated between 70% maximum transmission and 4% minimum transmission, for a transmission ratio of 17.5 and a switching ratio of about 17:1.

| Bias Voltage | Applied Voltage | Switching Ratio | % $T_{max}$ | % $T_{min}$ | $T_{max}/T_{min}$ |
| --- | --- | --- | --- | --- | --- |
| 0.3 | 4.7 | 15.7 | 84.7 | 60.0 | 1.4 |
| 0.2 | 4.5 | 22.5 | 46.0 | 26.0 | 1.8 |
| 0.6 | 10.0 | 16.7 | 97.0 | 42.6 | 2.3 |
| 1.35 | 12.0 | 8.9 | 94.0 | 56.8 | 1.6 |
| 0.03 | 12.0 | 400 | 94.0 | 22.0 | 4.3 |

EXAMPLE 7

Figure 9:
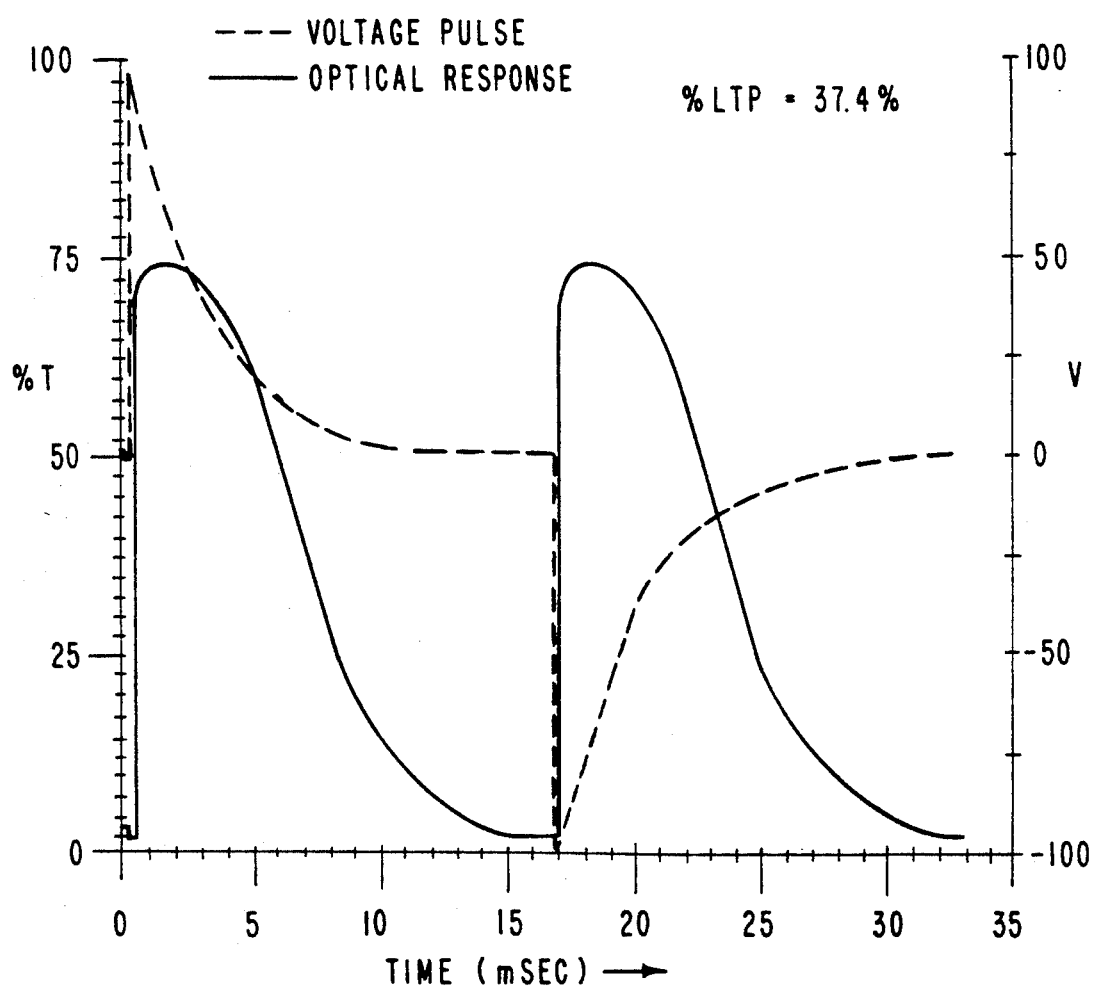
FIG. 9 is a graph of a PDLC response to alternating positive and negative DC voltage waveforms in accordance with the invention.

A voltage waveform of a pulse shape signal of alternating positive and negative DC pulses, each with a 16.7 ms frame time was applied to the PDLC cell of Example 5. This waveform corresponds to that obtained by placing an instantaneous (submillisecond) charge on the PDLC and having it leak off within a frame time by conduction through the PDLC due to its resistivity value of $7.5 \times 10^9$ ohm-cm (corresponding to a RC time constant of 3.3 ms), and then in the next frame placing the opposite polarity charge on the PDLC and having it leak off. The results are shown in FIG. 9. In each frame time, the optical response of the PDLC quickly reached a high transmission level within a millisecond, decayed relatively slowly until the DC pulse had decayed by more than an RC time constant, and then dropped back to its off-state transmission before the end of the 16.7 ms frame time. The positive and negative DC shaped pulses gave the same optical response. This resulted in an integrated light throughput which was 37.4% of the total incident light.

This invention may be implemented in a relatively simple active matrix raster-scan display system in which the pixel circuitry requires neither a storage capacitor nor a reset voltage to obtain the type of shaped pulse signal waveform described in Example 7 and shown in FIG. 9. A relatively low resistivity PDLC film, such as the $7.5 \times 10^9$ ohm-cm film in Example 7, provides the shaped pulse waveform needed for good optical throughput from the fast response on-time and integrated transmission effect from the exponential decay of the signal in each frame time at the 60 Hz frame rate. Similarly, a PDLC film with a resistivity of $1.5 \times 10^{10}$ ohm-cm provides fast response and good optical throughput when activated at a 30 Hz frame rate. Active matrix displays using nematic LCs (not in PDLCs) require much higher resistivity values (greater than $10^{11}$ ohm-cm) to obtain good light throughput without storage capacitors in the pixel circuitry when operated at 30 Hz and 60 Hz frame rates.

Figure 10:
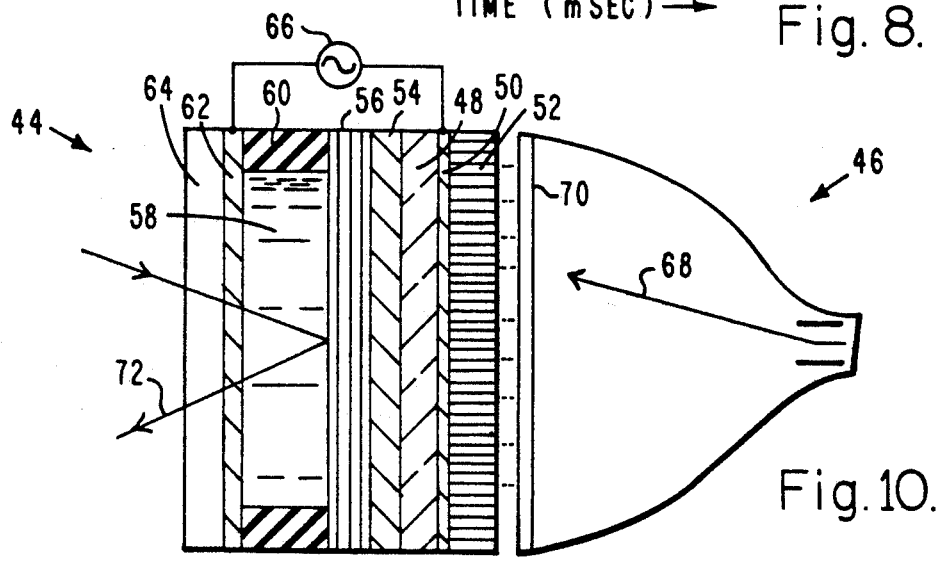
FIG. 10 is an illustrative sectional view of an LCLV/CRT system that can be used to implement the invention.

The invention may be implemented in an LCLV system such as that shown in FIG. 10. An LCLV 44 is addressed by a cathode ray tube 46. The LCLV includes a plasma enhanced chemical vapor deposition deposited a-Si:H photoconductor 48 with a transparent ITO electrode 50 and a fiberoptic face plate 52 on one side, and a CdTe light-blocking layer 54 on the other side. After the light-blocking layer comes a dielectric mirror 56, a PDLC film 58 surrounded by a spacer ring 60, an ITO counter-electrode 62, and a quartz readout window 64. An audio frequency power supply 66 is connected across the two electrodes 50 and 62.

The CRT 46 directs an electron beam 68 across a phosphor screen 70, which is positioned to illuminate the fiberoptic face plate 52 with radiation emitted from the locations on the screen that are struck by the electron beam. Controlled scanning of the beam across the phosphor screen thus forms an input image to the light valve.

The input image is transmitted through the fiberoptic face plate 52 and transparent electrode 50 to the photoconductor layer 48. The impedance of the photoconductor layer is lowered in proportion to the intensity of the incident light, resulting in a spatially varying impedance pattern. This causes a corresponding increase in the voltage dropped across the liquid crystal layer 58 in a spatially varying pattern that matches the input image. This pattern modulates a readout beam 72 that is directed through the liquid crystal, reflects off of dielectric mirror 56 and exits back through the liquid crystal. The input and output beams are thus optically isolated, giving the light valve a capability of accepting a low-intensity light image and converting it into a much higher output image. The light blocking layer 54 prevents the readout beam from interfering with the photoconductor layer 48. For a higher contrast reflective mode PDLC-LCLV display, a wedge-shape front glass surface 64 is used so that the front surface reflection of the readout beam 72 (whether at normal incidence or at a small off-normal angle of incidence as indicated in FIG. 10) is reflected out of the optical system used to collect the main readout beam 72 that is reflected by the dichroic mirrors.

The shape of the voltage waveform across the liquid crystal will be a combined function of the phosphors used in the CRT, and the type of photoconductor in the light valve. These should be selected through empirical determinations to obtain the desired waveform. For example, a suitable combination of phosphor and photoconductor for the voltage waveforms in Example 2 is obtained by using the fast response a-Si:H photosubstrate (with greater than 60 Hz frame rate) characterized by Sterling et al., (cited above) activated with a medium persistence red CRT phosphor such as P22R (about 2 ms decay to 10%). Another example is to use relatively thin (5 $\mu$m thick) boron-doped a-Si:H films such as those described by Ashley and Davis, "Amorphous Silicon Photoconductor in a Liquid Crystal Spatial Light Modulator", *Applied Optics,* Vol. 26, No. 2, 15 January 1987, pages 241-246, in conjunction with a medium-short persistence green CRT phosphor such as P31 (about 38 $\mu$s to 10%) to obtain voltage waveforms such as those in Example 1. This voltage waveform on the PDLC will provide frame rates of about 40 Hz, which is considerably greater than the 10 Hz frame rate Ashley and Davis observed using step pulse response from optically chopped white light with the nematic liquid crystal BDH-44. Alternatively, the CRT can be replaced by very short optical pulses from an intense scanning laser beam (e.g. 632.8 nm), or from a laser emitting diode (e.g. 705 nm), in which cases the voltage waveform will be controlled by the response characteristics of the photosubstrate. PDLC films that are activated with such signals have been found to give high light throughput, fast response, and good gray scale operation when the voltage pulse is allowed to decay below the PDLC threshold voltage in each frame time. PDLC films activated in this manner produce faster response times and/or higher light throughputs than typical nematic liquid crystal cells when each are operated on constant gray scale for each frame time.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of operating a polymer dispersed liquid crystal (PDLC) cell for transmission within a predetermined time frame, the PDLC having a threshold voltage for transmission, comprising:
    applying an initial voltage across the cell at a level in excess of said threshold voltage and for a shorter period of time than said time frame, and
    gradually reducing said initial voltage to a voltage level less than said threshold voltage within said time frame.

2. The method of claim 1, wherein said initial voltage is applied for a shorter time than the time over which said initial voltage is reduced to less than said threshold voltage.

3. The method of claim 1, wherein said initial voltage is reduced generally exponentially from said initial voltage level.

4. The method of claim 1, wherein said initial voltage level activates said PDLC to a partially transmissive state, and is maintained for a lesser period of time than the time required for the PDLC to reach a steady state transmission level associated with said initial voltage level.

5. The method of claim 1, further comprising the step of applying a bias voltage less than said threshold voltage to said PDLC for the duration of said time frame.

6. The method of claim 1, wherein said initial voltage is applied across the PDLC as a series of pulses, the envelope of said pulses establishing said initial voltage level.

7. The method of claim 6, wherein said pulses have alternating polarities.

8. A method of operating a polymer dispersed liquid crystal (PDLC) cell for transmission within a predetermined time frame, the PDLC having a threshold voltage for transmission and exhibiting a hysteresis transmission response to the successive application and removal of a voltage across the cell above said threshold, comprising:

applying an initial voltage across the cell and raising said initial voltage to a level in excess of said threshold voltage along a rising hysteresis curve and over an initial period of time that is shorter than said time frame, and gradually reducing said voltage to a level less than said threshold voltage at a rate slower than the rate at which the voltage was originally raised, but still within said time frame, so that the transmission level of said PDLC is lowered along a falling hysteresis curve that provides for a greater level of transmission for intermediate voltage levels than does said rising hysteresis curve.

9. The method of claim 8, wherein said voltage is reduced generally exponentially from said initial voltage level.

10. The method of claim 8, wherein said initial voltage level activates said PDLC to a partially transmissive state, and is maintained for a lesser period of time than the time required for the PDLC to reach a steady state transmission level associated with said initial voltage level.

11. The method of claim 8, further comprising the step of applying a bias voltage less than said threshold voltage to said PDLC for the duration of said time frame.

12. The method of claim 6, wherein said voltage is applied across the PDLC as a series of pulses, the envelope of said pulses establishing said voltage.

13. The method of claim 12, wherein said pulses have alternating polarities.

14. A liquid crystal light valve (LCLV) system, comprising:
an LCLV, comprising:
a photoconductor layer,
a polymer dispersed liquid crystal (PDLC) cell on one side of said photoconductor layer, and
means for applying a voltage across said photoconductor layer and PDLC cell, said photoconductor layer acting as a voltage divider in response to an optical input pulse to modulate the transmissivity of said PDLC cell, and
means for providing an optical input to said photoconductor layer in response to a received input signal,
said optical input means and said photoconductor being selected to collectively produce a voltage pulse across said PDLC cell that is characterized within a predetermined frame time by a relatively rapid rise to an initial voltage over a PDLC hysteresis rise curve of transmission versus voltage, followed by a gradual decline from said initial voltage to a final level below threshold voltage over a PDLC hysteresis fall curve thereof, that provides for a greater level of transmission for intermediate voltage levels between said initial and final voltages than does said hysteresis rise curve.

15. The LCLV system of claim 14, wherein said optical input means comprises a cathode ray tube (CRT) which irradiates a phosphor layer, said phosphor layer and said photoconductor being selected to collectively produce said voltage pulses.

16. The LCLV of claim 14, further comprising a mirror between said PDLC cell and said photoconductor layer for operating said LCLV in a reflective mode.

17. The LCLV system of claim 14, wherein said optical input means comprises a scanning laser beam or a laser emitting diode to activate said photoconductor, said voltage pulse being controlled by the selection of said photoconductor.

18. A liquid crystal active matrix system, comprising:
an active matrix substrate layer,
a PDLC cell on the activating side of the active matrix layer organized into an array of pixels, and
means for driving the active matrix to apply selected voltage pulses across the PDLC within respective frame times for each pixel in response to a received input signal,
said voltage pulses and the resistivity of said PDLC being selected to produce a voltage across said PDLC cell that is characterized in each frame time by a relatively rapid rise to an initial voltage over a PDLC hysteresis rise curve of transmission versus voltage, followed by a gradual decline from said initial voltage to a final level below threshold voltage over a PDLC hysteresis fall curve thereof, and that provides a greater level of transmission for intermediate voltage levels between said initial and final voltages than does said hysteresis rise curve.

19. The active matrix system of claim 18, wherein driving means causes said activating pulses to alternate in polarity each frame time.

20. The active matrix system of claim 18, wherein said active matrix substrate is comprised of reflective pixels for activation of the PDLC cell in a reflective mode.

* * * * *